United States Patent
Rowe et al.

(10) Patent No.: US 6,800,029 B2
(45) Date of Patent: Oct. 5, 2004

(54) GAMING ENVIRONMENT INCLUDING PORTABLE TRANSACTION DEVICES FOR RATING PLAYERS

(75) Inventors: Rick Rowe, Reno, NV (US); Larry C. Lewis, Las Vegas, NV (US); Brian Ford, Henderson, NV (US); Daryn Kiely, Henderson, NV (US)

(73) Assignee: IGT, Reno, NV (US)

( * ) Notice: Subject to any disclaimer, the term of this patent is extended or adjusted under 35 U.S.C. 154(b) by 29 days.

(21) Appl. No.: 10/115,164

(22) Filed: Apr. 2, 2002

(65) Prior Publication Data

US 2002/0103027 A1 Aug. 1, 2002

Related U.S. Application Data

(63) Continuation-in-part of application No. 09/544,884, filed on Apr. 7, 2000, now Pat. No. 6,682,421.

(51) Int. Cl.$^7$ .................................................. A03F 13/00
(52) U.S. Cl. ............................... 463/25; 463/39; 463/29
(58) Field of Search ........................... 463/1, 16, 25–29, 463/39–42, 20; 700/91–93; 273/139

(56) References Cited

U.S. PATENT DOCUMENTS

| | | | | |
|---|---|---|---|---|
| 5,770,533 A | * | 6/1998 | Franchi | 463/42 |
| 5,779,545 A | * | 7/1998 | Berg et al. | 463/22 |
| 5,779,546 A | * | 7/1998 | Meissner et al. | 463/25 |
| 6,019,283 A | * | 2/2000 | Lucero | 235/380 |
| 6,142,876 A | * | 11/2000 | Cumbers | 463/25 |
| 6,270,410 B1 | * | 8/2001 | DeMar et al. | 463/20 |
| 6,331,144 B1 | * | 12/2001 | Walker et al. | 463/20 |
| 6,508,709 B1 | * | 1/2003 | Karmarkar | 463/42 |
| 6,511,377 B1 | * | 1/2003 | Weiss | 463/25 |
| 6,514,140 B1 | * | 2/2003 | Storch | 463/25 |
| 6,533,662 B2 | * | 3/2003 | Soltys et al. | 463/25 |
| 6,554,707 B1 | * | 4/2003 | Sinclair et al. | 463/39 |

* cited by examiner

Primary Examiner—John M. Hotaling, II
(74) Attorney, Agent, or Firm—Beyer, Weaver & Thomas LLP

(57) ABSTRACT

A gaming environment includes portable transaction/tracking devices for rendering services and tracking game play. In one embodiment, the gaming environment includes at least one table game and a portable transaction interface capable of receiving and sending information over a wireless communication link to/from a player tracking server adapted to store player identification and player game play data. One embodiment of a method comprises the tracking of player game play in such a gaming environment using the portable transaction device or interface. Player identification information and player game play data is input to the portable transaction device and transmitted to the player tracking server for association with a player's rating file. Graphical information may be generated and displayed to the user of the portable transaction device regarding the gaming environment. This information may be used by the user to identify players or their location.

16 Claims, 6 Drawing Sheets

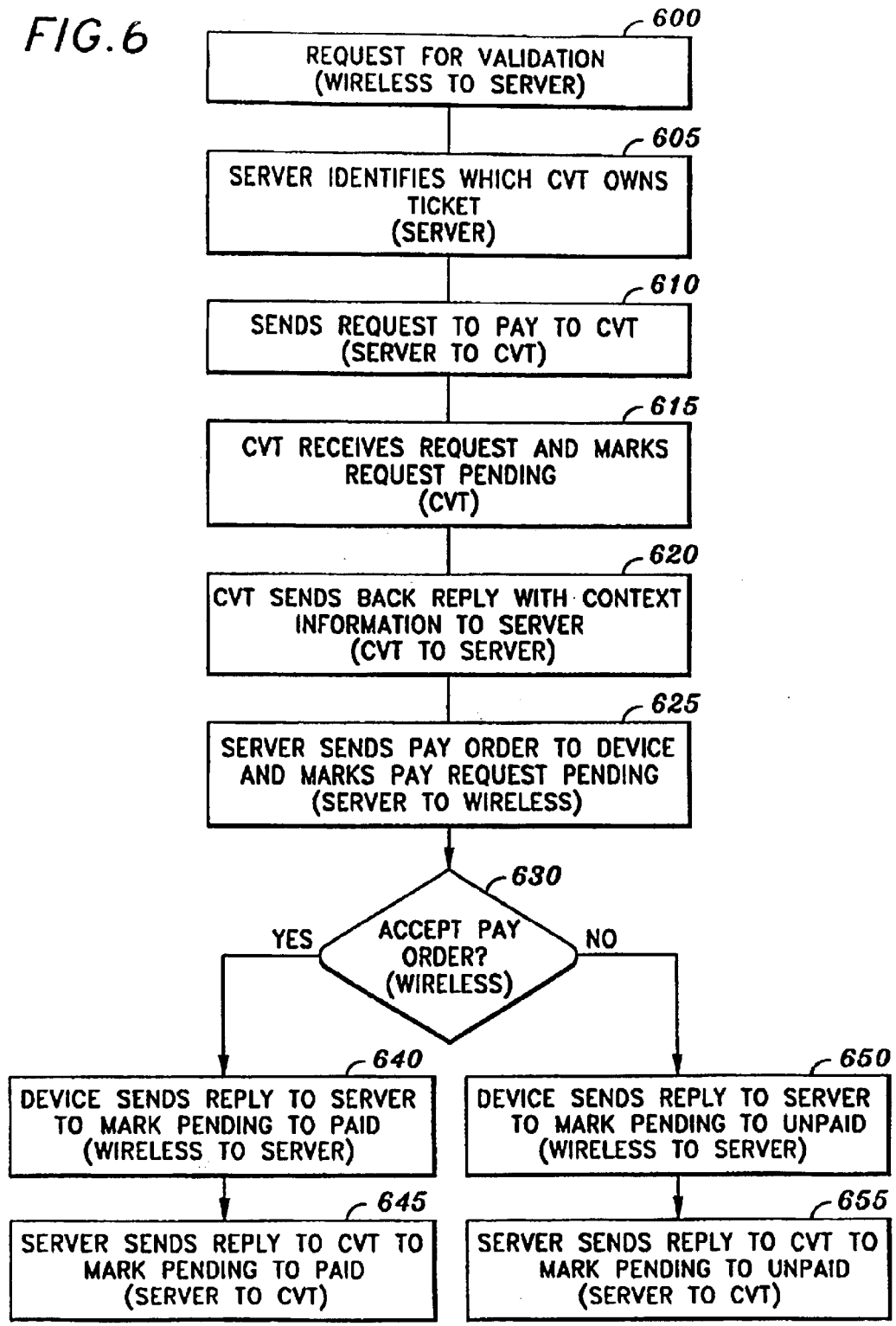

GAMING ENVIRONMENT INCLUDING PORTABLE TRANSACTION DEVICES FOR RATING PLAYERS

RELATED APPLICATIONS

This application is a continuation-in-part of U.S. application Ser. No. 09/544,884, filed Apr. 7, 2000, now U.S. Pat. No. 6,682,421.

FIELD OF THE INVENTION

The present invention relates to gaming environments, and more particularly to such an environment including portable transaction implementing devices.

BACKGROUND OF THE INVENTION

In casino or other gaming environments, a variety of data regarding electronically controlled gaming devices is collected. This information is used in a variety of ways, including for the direct benefit of the player.

Commonly, information regarding a player's game play at an electronic gaming machine, such as a video poker or slot machine, is tracked. Based on the player's game play, such as amounts bet or amounts won or lost, the casino may reward the player with a complimentary award or "comp." For example, a player who plays one or more gaming devices for a particular length of time or places bets aggregating a certain total may be rewarded for their level of play with a comp. The comp may comprise free game play, free lodging or other free or reduced cost goods or services.

Gaming device information is also tracked to determine the level of game play at the device. A casino may determine from this game play information, for example, that players no longer like to play a particular game. The casino can then replace the device with a different device which presents a game which players like better. A casino may also determine that the level of play of a machine is low because the gaming device does not have a high enough level of payback, or is placed in an undesirable location within the casino.

Of course, the tracking of gaming device data is useful for accomplishing a wide variety of other internal casino functions. For example, using coin in and coin out data at a machine, the casino can reconcile collected coins from the device to ensure that theft is not occurring at the device.

These functions are easily implemented with respect to electronic gaming devices which are arranged to collect or generate the desired data and transmit it, such as via a wired network, to a central computer. However, many casinos offer games by other than electronically controlled gaming devices. For example, the well-known games of Blackjack, Baccarat and Roulette are generally presented at gaming tables. The execution of these games is largely mechanical, such as in the spinning of the Roulette wheel, and the dealing of cards.

A means for obtaining information regarding table game play for use by casinos and players is likewise desired.

SUMMARY OF THE INVENTION

A gaming environment which includes portable transaction/tracking devices and a method of using the portable devices to render services and track game play is disclosed.

In one embodiment, the gaming environment includes at least one table game. In addition, the gaming environment includes at least one portable transaction device having a display and at least one input device. The portable transaction device is capable of receiving and sending information over a wireless communication link. The environment also includes at least one player tracking server adapted to store player identification and player game play data, receive player identification and player game play data transmitted from said portable transaction interface, and transmit data to the portable transaction interface.

In one embodiment, the portable transaction device includes a microprocessor and a memory. The portable transaction device is adapted to display one or more transaction interfaces, such as a player tracking interface. The player tracking interface is associated with a menu of player tracking functions. These options include the opening of a player rating, input of player game play data or player identification information, and the closing of a player rating.

One embodiment of a method comprises the tracking of player game play in such a gaming environment using the portable transaction device or interface. In accordance with one embodiment of the method, player identification information is accepted at the portable transaction device. This step may comprise reading player identification information from a player tracking card, such as with a bar code or magnetic stripe reader. The player identification information is transmitted from the portable transaction interface to the player tracking server.

Upon instruction to open a player rating for the identified player as transmitted by instruction from the portable transaction device, the player tracking server opens a player rating file. The user of the portable transaction device gathers player game play data, such as information regarding a player's bets, wins and losses while playing a table-type game. This information is accepted by the portable transaction device and transmitted to the player tracking server for association with the player's rating file.

In one embodiment, the method includes the step of the portable transaction device displaying a graphical user interface. The interface includes a plurality of fields into which the user of the interface may input data, such as player identification and player game play data.

The method includes the step of accepting an instruction to close a player rating, such as when a user of the transaction device determines that a player has stopped playing a table game. In response to input, the portable transaction interface transmits a signal to the player tracking server to cause the player's rating to be closed.

As further aspects of the method, in one embodiment the user of the portable transaction interface may update a player's profile, which profile may include identification information such as physical characteristic information. In addition, the user of the portable transaction device may obtain player identification or profile information from the player tracking server upon request.

As another aspect of the method, graphical information may be generated and displayed to the user of the portable transaction device regarding the gaming environment. This information may be used by the user to identify players or their location. The graphical information may comprise a simple diagram of game tables and seats.

The portable transaction device may also be utilized to perform a variety of other player tracking related functions. For example, the portable transaction device may be used to enroll a player in the tracking or rewards system. Groups or "junkets" of players may also be tracked.

The portable transaction device may be implemented, in one or more embodiments, to implement a variety of game-related functions or transactions. These functions may include, but are not limited to accounting functions, such as gaming table fill and/or credit transactions, table opening or closing transactions, and marker issuance and redemption transactions. The functions may also include providing game rules, calculating payoffs, requesting security, and monitoring player counts at tables or groups of tables.

In accordance with the invention, a player's game play may be tracked even though the game which the player is playing is not of the type which is electronically controlled and can provide play information directly in electronic or other form. Using a portable transaction device of the invention, a user, such as a casino employee, may freely move about table and other games and obtain and input player game play data. The player game play data may be used to create player ratings, i.e. game play data for a player's game session, which data may be used by the casino to award "comps" and for other purposes, such as accounting.

Further objects, features, and advantages of the present invention over the prior art will become apparent from the detailed description of the drawings which follows, when considered with the attached figures.

DESCRIPTION OF THE DRAWINGS

FIG. 6 is a flow diagram of yet another method of use of the portable transaction device of the invention by a gaming service operator.

DETAILED DESCRIPTION OF THE INVENTION

In general, the present invention is a gaming environment, and more particularly a gaming environment including one or more portable transaction devices. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
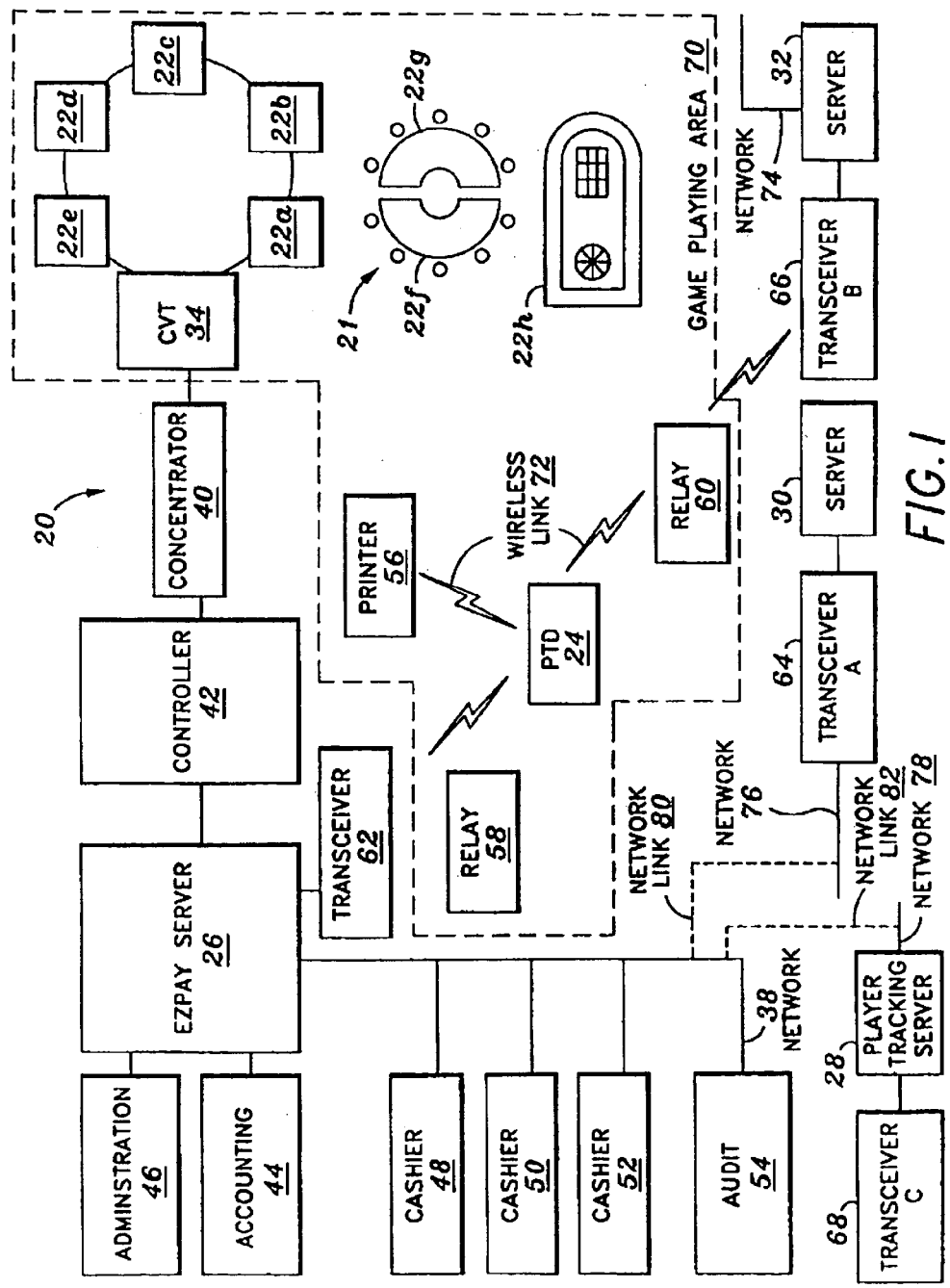
FIG. 1 is a block diagram of a gaming system in accordance with an embodiment of the invention.

FIG. 1 is a block diagram of a gaming system 20 of a gaming environment in accordance with one embodiment of the invention. The various aspects of the gaming system will first be described in overview, and then in more detail below.

As illustrated, the gaming system 20 includes a plurality of gaming machines 22a,22b, 22c,22d,22e. In general, the gaming machines 22a,22b,22c,22d,22e are arranged to present one or more games to a player. Preferably, the games are of the type requiring the placement of a wager or bet and are of the type by which a player receiving a winning outcome is provided an award, such as a monetary award. These devices may comprise electrical, mechanical or electromechanical devices, such as video poker and slot machines.

In addition, the gaming system 20 includes a plurality of table games or devices 22f,22g, 22h. A variety of games may be presented to one or more players at these tables. These games may include Roulette, Baccarat, Blackjack, Pai Gow and others.

In a preferred embodiment, the gaming machines 22a, 22b,22c,22d,22e are electronically controlled and in communication with one or more other devices. In one embodiment, the gaming machines 22a,22b,22c,22d,22e are in communication with a payment system referred to herein as the "EZ-Pay" system. This system includes a server 26 for receiving and transmitting information. In general, the EZ Pay system is utilized to accept payment from a player for the playing of games and obtaining of other goods and services, and for paying a player winnings or awards.

In the embodiment illustrated, the gaming system 20 includes other servers 30,32 for transmitting and/or receiving other information, processing information, storing information, and engaging in other functions. In one embodiment, as described below, one server 30 may comprise a prize transaction server. Another server 32 may comprise a food transaction server. As described in greater detail below, the gaming system 20 includes a player tracking server 28 as well. Preferably, each of the gaming machines 22a,22b,22c,22d,22e are in communication with the player tracking server 28. Other servers may be provided. The servers may have a variety of configurations. In one embodiment, the servers comprise computing devices and include a processor, memory and a communication interface.

The EZ Pay system will now be described in more detail with reference to FIG. 2. In general, the EZ Pay system is an award ticket system which allows award ticket vouchers to be dispensed in lieu of the traditional coin awards or reimbursements when a player wins a game or wishes to cash out. These tickets may also be used by gaming machines and other devices for providing value, such as for payment of goods or services including as a bet or ante for playing a game.

Figure 2:
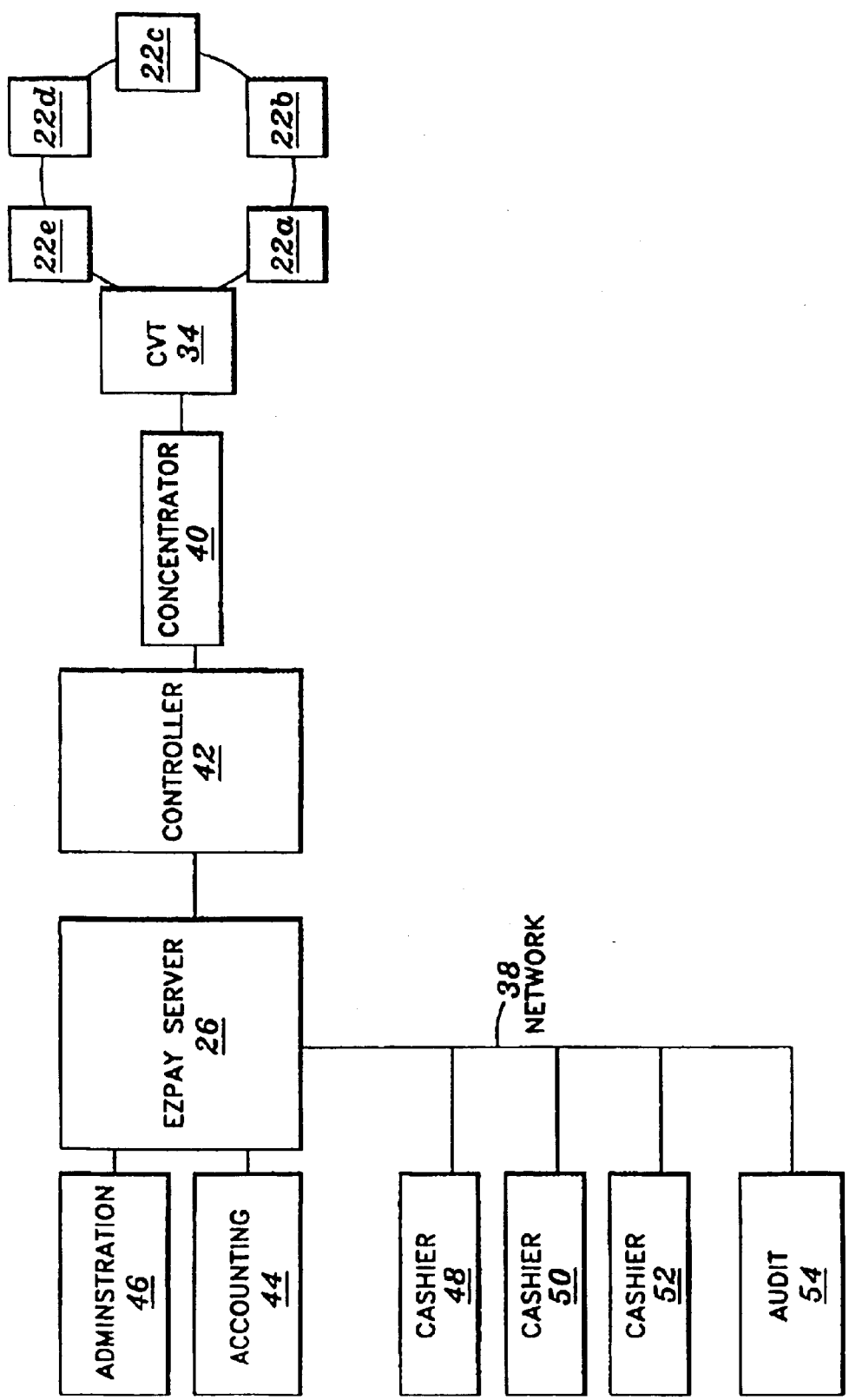
FIG. 2 is a block diagram of a payment system forming a part of the gaming system illustrated in FIG. 1.

FIG. 2 illustrates one embodiment of such a system in block diagram form. As illustrated, the gaming machines 22a,22b,22c,22d,22e are shown connected to a clerk validation terminal (CVT) 34. All of the gaming machines 22a,22b,22c,22d,22e print ticket vouchers which may be exchanged for cash or accepted as credit or indicia in other gaming machines.

The CVT 34 stores ticket voucher information corresponding to the outstanding ticket vouchers that are waiting for redemption. This information is used when the tickets are validated and cashed out. The CVT 34 stores the information for the ticket vouchers printed by the gaming machines connected to the CVT 34. To cash out the ticket voucher, the ticket voucher is validated by comparing information obtained from the ticket with information stored with the CVT 34. After a ticket voucher has been cashed out, the CVT 34 marks the ticket as paid in a database to prevent a ticket voucher with similar information from being cashed multiple times.

Multiple groups of gaming machines may be connected to a plurality of CVTs, and the multiple CVTs may be connected together in a cross validation network 38. The cross validation network typically comprises one or more concentrators 40 which accept input from the CVTs and enables communications to and from the CVTs using one communication line. The concentrator 40 is connected to a front end controller 42 which may poll the CVT(s) 34 for ticket voucher information. The front end controller 42 is connected to the EZ pay server 26 which may provide a variety of information services for the award ticket system including accounting 44 and administration 46.

The cross validation network 38 allows ticket vouchers generated by any gaming machine connected to the cross validation network 38 to be accepted by other gaming machines in the cross validation network 38. Additionally, the cross validation network 38 allows a cashier at a cashier station 48,50,52 to validate any ticket voucher generated from a gaming machine within the cross validation network 38. To cash out a ticket voucher, a player may present a ticket voucher at one of the cashier stations 48,50,52. Information obtained from the ticket voucher is used to validate the ticket by comparing information on the ticket with information stored on one of the CVTs 34 connected to the cross validation network 38. As tickets are validated, this information may be sent to another computer 54 providing audit services.

As described in greater detail below, the electronically controlled gaming devices 22a,22b,22c,22d,22e are preferably linked to the player tracking server 28 and other servers 30,32.

The table games, such as presented at the card tables 22f,22g and Roulette table 22h are, as is known, not electronically controlled. As such, in one embodiment, these table games are not directly connected to the EZ Pay server 26. Likewise, the table games are not directly connected to the player tracking server 28 or other servers 30,32. However, a means is provided, as disclosed below, for providing game play and player information regarding those table games 22f,22g,22h and engaging in other functions related to those table games to other parts of the gaming system 20, such as the player tracking server 28.

In one or more embodiments of the invention, this means comprises one or more portable transaction devices (PTDs) 24. The PTDs 24 are described in detail below. In one embodiment, the PTD 24 is a portable device capable of transmitting and receiving information via a wireless communication link/network.

Referring again to FIG. 1, the gaming system 20 also preferably includes a printer 56, wireless communication relays 58 and 60, and wireless transceivers 62, 64, 66 and 68 connected to the remote servers 26, 28, 30 and 32. The functions of these various additional components is described below. In general, however, a gaming operator may obtain a PTD 24 and associate table game information with the remainder of the gaming system 20, and be provided with information from other components of the system. The gaming system 20 may include a wide variety of devices or components not illustrated or described herein.

Figure 3:
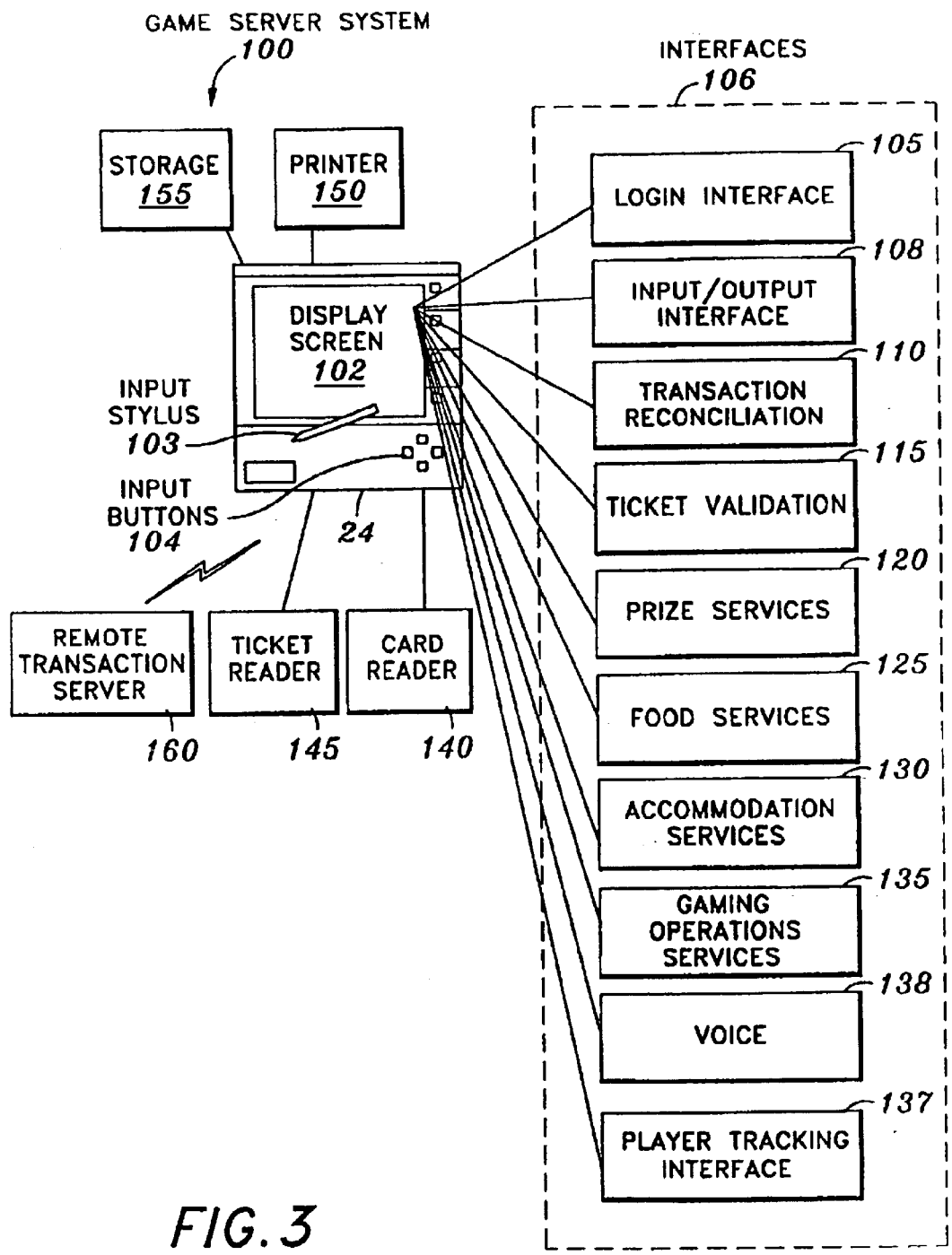
FIG. 3 is a schematic diagram of a portable transaction device of the gaming system illustrated in FIG. 1.

FIG. 3 illustrates one embodiment of the PTD 24 and a block diagram of a transaction system 100 which may be implemented by the gaming system 20 illustrated in FIG. 1. In one embodiment, the transaction system 100 is comprised of at least one PTD 24 and a number of input and output devices. The PTD 24 is generally comprised of a display screen 102 which may display a number of game service interfaces 106. These game service interfaces 106 are generated on the display screen 102 by a microprocessor of some type (not shown) within the PTD 24. Examples of a hand-held PTD 24 which may accommodate the game service interfaces 106 shown in FIG. 3 are manufactured by Symbol Technologies, Incorporated of Holtsville, N.Y. The interface or menu data may be stored in a local memory, or the data may be transmitted to the PTD 24 from a remote location (such as a data server). This reduces the memory requirement of the device.

The service interfaces 106 may be used to implement a variety of functions, such as providing a variety of game service transactions and gaming operations services, including the tracking of player play of table games. The game service interfaces 106, including a login interface 105, an input/output interface 108, a transaction reconciliation interface 110, a ticket validation interface 115, a prize services interface 120, a food services interface 125, an accommodation services interface 130, a gaming operations interface 135, and a player tracking interface 137 may be accessed via a main menu with a number of sub-menus that allow a game service representative to access the different display screens relating to the particular interface.

In one or more embodiments, some or all of the interfaces may be available to a user of the PTD 24. Access to the interfaces 106 may depend on a variety of circumstances, such as the status or identification of the operator. In one or more embodiments, only certain interfaces 106 may be displayed depending on the status of the user of the PTD 24. In one embodiment, the particular interfaces 106 which are displayed and thus accessible for use are determined by the status of the user as indicated through a login function. In a preferred embodiment, when the PTD 24 is operable (such as when a power button is activated) the default status for the PTD 24 is the display of the login interface 105. Once a user of the PTD 24 has logged in, then the status of the PTD display is changed.

In one or more embodiments, the login interface 105 may allow a game service representative or other operator to enter a user identification of some type and in one embodiment, verify the user identification with a password. When the display screen 102 is a touch screen, the user may enter the user/operator identification information on a display screen comprising the login interface 105 using an input stylus 103 and/or using one or more input buttons 104. Using a menu on the display screen of the login interface 105, the user may select other display screens relating to the login and registration process. For example, another display screen obtained via a menu on a display screen in the login interface may allow the PTD 24 to scan a finger print of the game service representative for identification purposes or scan the finger print of a game player.

In the event a user identifies themselves as a gaming operator or representative, then the PTD 24 may be arranged to display one or more other interfaces such as those listed above and described in detail below.

In one embodiment, the PTD 24 includes a ticket reader 145 and a card reader 140. The ticket reader 145 may be of a variety of types. In one embodiment, the reader comprises a bar-code reading optical scanner. In this arrangement, a user of the PTD 24 may simply pass an employee badge which is bar-coded, in front of the bar-code reader. In one embodiment, the card reader 140 comprises a magnetic-stripe card type reader for reading information associated with an employee identification card including a magnetic stripe. An employee may be required to enter a password or other confirmation to confirm that the employee badge which is being used to gain access to the PTD 24 has not been stolen or used by an unauthorized person.

After having provided the appropriate authorization, access may be provided to the user of the PTD 24 of one or more of the following interfaces 106. Other forms of authorization may be utilized, including a variety of other biometric identifiers (such as a retinal scan or, as described above, a fingerprint). Biometric or other identifiers may be used alone or in conjunction with passwords. It will be appreciated that these forms or authorization may be utilized with other devices of the system 20 where security is required.

In one or more embodiments, an authorized user may be provided with access to the input/output interface 108. In one or more embodiments, the input/output interface 108 permits a user to select, from a list of devices stored in memory on the PTD 24, a device from which the PTD may input game service transaction information or output game service transaction information. For example, the PTD 24 may communicate with the ticket reader 145. As another example, the PTD 24 may input information from the card reader 140. Such input may be useful, for example, if a game service operator wishes to verify the authenticity of a player tracking card or the like.

The PTD 24 may output game and service transaction information to a number of devices. For example, to print a receipt, the PTD 24 may output information to a printer 150. In this game service transaction, the PTD 24 may send a print request to the printer 150 and receive a print reply from the printer 150. The printer 150 may be a large device at some fixed location or a portable device carried by the game service representative. As another example, the output device may be the card reader 140 that is able to store information on a magnetic card or smart card. Other devices which may accept input or output from the PTD 24 are personal digital assistants, microphones, keyboard, storage devices, gaming machines and remote transaction servers.

The PTD 24 may communicate with the various input mechanisms and output mechanisms using both wire and wire-less communication interfaces. For example, the PTD 24 may be connected to the printer 150 by a wire connection of some type. However, the PTD 24 may communicate with a remote transaction server 160 via a wire-less communication interface including a spread spectrum cellular network communication interface. An example of a spread spectrum cellular network communication interface is Spectrum 24 offered by Symbol Technologies of Holtsville, N.Y., which operates between about 2.4 and 2.5 Gigahertz. The information communicated using the wire-less communication interfaces may be encrypted to provide security for certain game service transactions such as validating a ticket for a cash payout. Some devices may accommodate multiple communication interfaces. Such a spread spectrum network is but one possible communication scheme.

In one or more embodiments, each PTD 24 has a unique identifier which is utilized to identify which PTD 24 data is transmitted from and to which data is to be transmitted to.

Another type of interface that may be stored on or presented at the PTD 24 is the award ticket validation interface 115. One embodiment of the award ticket interface 115 may accommodate the EZ pay ticket voucher system and validate EZ pay tickets as previously described. However, when other ticket voucher systems are utilized, the award ticket validation interface 115 may be designed to interface with the other ticket voucher systems. Using the award ticket validation interface 115, a game service representative may read information from a ticket presented to the game service representative by a game player using the ticket reader and then validate and pay out an award indicated on the ticket.

Typically, the award ticket contains game service transaction information which may be verified against information stored on the remote transaction server 160. To validate the ticket may require a number of game service transactions. For example, after obtaining game service transaction information from the award ticket, the PTD 24 may send a ticket validation request to the remote transaction server 160 using the spread spectrum communication interface and receive a ticket validation reply from the remote server 160. In particular, the validation reply and the validation request may be for an EZ Pay ticket. After the award ticket has been validated, the PTD 24 may send a confirmation of the transaction to the remote server 160. Details of the game service transaction information validation process are described with reference to FIG. 4. In other embodiments, the award ticket interface 115 may be configured to validate award information from a smart card or some other portable information device or validate award information directly from a gaming machine.

As game, service and other transactions or events are completed, game and service transaction information may be stored on a storage device 155. The storage device 155 may be a remote storage device or a portable storage device. The storage device 155 may be used as a back-up for auditing purposes when the memory on the PTD 24 fails and may be removable from the PTD 24.

Another type of game service interface that may be stored on or presented at the PTD 24 is the prize service interface 120. As an award on a gaming machine (i.e., machines 22a,22b,22c, 22d,22e in FIG. 1), a game player may receive a ticket that is redeemable for merchandise including a bicycle, a computer or luggage. Using the prize service interface 120, a game service representative may validate the prize service ticket and then check on the availability of certain prizes. For example, when the prize service ticket indicates the game player has won a bicycle, the game service representative may check whether the prize is available in a nearby prize distribution center. In one embodiment, a player may be awarded a prize of a particular level, there being one or more particular prizes on that level. In such event, the user may use the prize interface 120 to determine what prizes are currently available in the prize level just awarded. The PTD 24 may validate a prize ticket and check on the availability of certain prizes by communicating with a remote prize server. Further, the game service representative may have the prize shipped to a game player's home or send a request to have the prize sent to a prize distribution location. The game service transactions needed to validate the prize ticket including a prize validation request and a prize validation reply, to check on the availability of prizes and to order or ship a prize may be implemented using various display screens located within the prize interface 120. The different prize screens in the prize service interface 120 may be accessed using a menu located on each screen of the prize service interface 120. In other embodiments, the prize service interface 120 may be configured to validate prize information from a smart card or some other portable information device or validate award information directly from a gaming machine.

Another type of game service interface that may be stored on or presented at the PTD 24 is the food service interface 125. As an award on a gaming machine or as compensation for a particular amount of game play, a game player may receive a free drink or food. Using the food service interface 125, a game service representative may validate such an award (for example, the award may be provided to a player of the gaming device 22a in the form of a ticket) and check on the availability of the award. For example, when the game player has received an award ticket valid for a free meal, the food service interface 125 may be used to check on the availability of a dinner reservation and make a dinner reservation. As another example, the PTD 24 may be used to take a drink or food order. Such an order may be processed via the remote food server 32 (see also FIG. 1). The transactions needed to validate a food ticket or award, to check on the availability of food services, request a food service and receive a reply to the food service request may be implemented using various display screens located within the food service interface 125. These display screens may be accessed using a menu located on each screen of the food service interface 125. In other embodiments, the food service interface 125 may be configured to validate food service information from a smart card or some other portable information device.

Another type of game service interface that may be stored on or presented at the PTD 24 is an accommodation service interface 130. As an award for game play or as compensation for a particular amount of game play, a game player may receive an award in the form of an accommodation service such as a room upgrade, a free night's stay or other accommodation prize. Using the accommodation service interface 130, the user may check on the availability of certain accommodation prizes. For example, when the game player has received an award for a room upgrade, the accommodation service interface 130 may be used to check on the availability of a room and to make a room reservation. Regardless of whether the player has won an accommodation award, the user of the PTD 24 may utilize the accommodation service interface 130 to reserve a room (such as an additional night's stay) or an upgrade to a room. In one embodiment, a player of a game may be issued a ticket (such as from a gaming machine 22a,22b,22c,22d,22e in FIG. 1), and a gaming representative may use the accommodation service interface 130 in order to validate the player's award ticket and check on the availability of the award and institute the award. As another example, the PTD 24 may be used to order a taxi or some other form of transportation for a player at a gaming machine preparing to leave the game playing area. The game playing area may be a casino, a hotel, a restaurant, a bar or a store. This or another interface of the PTD 24 may be used to implement/obtain other services, such as to transmit a message to an automobile valet service requesting that the user's car be obtained for use.

The PTD 24 may be used to validate the accommodation service award and check on the availability of certain accommodation awards by communicating with a remote accommodation server. The transactions needed to validate the accommodation ticket, check on the availability of accommodation services, request an accommodation service and receive a reply to the accommodation service request may be implemented using various display screens located within the accommodation service interface 130. These display screens may be accessed using a menu located on each screen of the accommodation service interface 130. In other embodiments, the accommodation service interface 130 may be configured to validate accommodation service information from a smart card or some other portable information device.

Another type of game service interface that may be stored on or presented at the PTD 24 is a gaming operations service interface 135. Using the gaming service interface 135 on the PTD 24, a game service representative may perform a number of game service transactions relating to gaming operations. A number of such transactions are disclosed in greater detail below. Generally, however, there may be a variety of such transactions which may be accomplished or implemented via the PTD 24. The interface 135 may be adapted to permit the user of the PTD 24 to provide game related information or request game related information. For example, a user may request a fill or credit transaction at a gaming table. A user may also utilize the PTD 24 to provide information related to the opening or closing of a gaming table. Using this interface 135, the user may obtain specific game rules or calculate bet payoffs. The user may trigger a request for additional security. The user may also enter information regarding player traffic or headcount.

The user may utilize the gaming operations service interface 135 to request maintenance or other services. For example, if a game player has spilled a drink in the game playing area, a game service representative may send a request to maintenance to have someone clean up the accident and receive a reply from maintenance regarding their request. The maintenance request and maintenance reply may be sent and received via display screens selected via a menu on the screens of the gaming operations service interface 135. As another example, when a game service representative observes a damaged gaming machine such as a broken light, the game service representative may send a maintenance request for the gaming machine using the PTD 24.

Another type of game service interface that may be stored on or presented at the PTD 24 is a transaction reconciliation interface 110. Typically, the PTD 24 contains a memory storing game service transaction information. The memory may record the type and time when particular game service transactions are performed. At certain times, the records of the game service transactions stored within the PTD 24 may be compared with records stored at an alternate location. For example, for an award ticket validation, each time an award ticket is validated and paid out, a confirmation is sent to the remote server 160. Thus, information regarding the award tickets, which were validated and paid out using the PTD 24, should agree with the information regarding transactions by the PTD 24 stored in the remote server 160. The transaction reconciliation process involves using the transaction reconciliation interface 110 to compare this information.

Another type of game service interface that may be stored on or presented at the PTD 24 is a voice interface 138. Using the spread spectrum cellular or other communication network incorporated into the PTD 24, a game service representative may use the PTD 24 as a voice communication device. This voice interface 138 may be used to supplement some of the interfaces previously described. For example, when a game player spills a drink the game service representative may send a maintenance request and receive a maintenance reply using the voice interface 138 on the PTD 24. As another example, when a game player requests to validate a food service such as free meal, such a request may be made by the game service representative at a restaurant or other location using the voice interface 138 on the PTD 24.

Another type of game service interface that may be stored on or presented at the PTD 24 is the player tracking interface 137. Preferably, the player tracking interface 137 may be used by the game service representative or other operator to input game play, player and other information, and view game play, player and other information. For example, the player tracking interface 137 may be used to input player game play information to the player tracking server 28 for use by the casino in issuing the player "comps" or other rewards. The player tracking interface 137 may also be used to enter table game data which is used in accounting and other reconciliation and monitoring functions. The player tracking interface 137 may also be used by the operator to obtain information, such as player identification information for use in monitoring players.

As will be appreciated by those of skill in the art, the PTD 24 may have a variety of configurations. For example, interface information need not be stored at the PTD 24 but may be stored elsewhere and transmitted to the PTD 24. In such an embodiment, the PTD 24 may have a much more limited amount of data memory. In one embodiment, the PTD 24 includes a processor for executing control code, such as that necessary to operate the display 102, accept input from the stylus 103 or input buttons 104 or the like. In addition, the PTD 24 preferably includes a buffer memory for accepting data transmitted from the game server 28. This data may comprise data for displaying game information, such as video and sound content.

Various aspects of the use of the PTD 24 described above will now be described. In one or more embodiments, an operator may use the PTD 24 to track player game play, issue and redeem tickets, and obtain products and services, such as food, for players. In addition, an operator may utilize the PTD 24 to input information regarding table game activity. Several examples of a method of such use are detailed below in conjunction with FIGS. 4 through 6.

When a game service representative contacts a game player seeking a game service or other service in a game playing area 70 (see FIG. 1), the game service representative uses an appropriate game service interface 106 on the display screen of the PTD 24, as described with reference to FIG. 3, to provide the game service requested by the game player. For example, when a game player requests an EZ Pay ticket validation, the game service representative brings the EZ Pay ticket validation interface 115 onto the display screen of the PTD 24 using menus available on the display screen 102. Then, the game service representative scans the EZ Pay ticket using a ticket reader connected to the PTD 24 to obtain unique ticket information. Next, the PTD 24 sends an EZ Pay ticket validation request using the wire-less communication interface to the EZ Pay server 26.

Typically, the ticket validation request is composed of one or more information packets compatible with the wire-less communication standard being employed. Using a wireless link 72, the one or more information packets containing the ticket validation request are sent to the transceiver 62 connected to the EZ Pay server 26. The transceiver 62 is designed to receive and send messages from the one or more PTDs 24 in the game playing area 70 in a communication format used by the PTDs 24. Depending on the location of the PTD 24 in the game playing area 70, the communication path for the information packets to and from the PTD 24 may be through one or more wire-less communication relays including 58 and 60. For example, when the PTD 24 is located near gaming machine 22a, the communication path for a message from the PTD 24 to the EZ Pay server 26 may be from the PTD 24 to the relay 60, from the relay 60 to the relay 58, from the relay 58 to the transceiver 62 and from the transceiver 62 to the EZ Pay server 26. As the location of the PTD 24 changes in the game playing area 70, the communication path between the PTD 24 and the EZ Pay server 26 may change.

After receiving an EZ Pay ticket validation reply from the EZ Pay server 26, the EZ Pay ticket may be validated using an appropriate display screen on the PTD 24. After cashing out the ticket, the game service representative may send a confirmation of the transaction to the EZ Pay server 26 using the PTD 24. The transaction history for the PTD 24 may be stored on the PTD 24 as well as the EZ Pay server 26. Next, a receipt for the transaction may be printed out. The receipt may be generated from a portable printer carried by the game server representative ad connected to the PTD 24 in some manner or the receipt may be generated from a printer 56 at a fixed location.

After providing a number of game services comprising a number of game service transactions to different game players in the game playing area 70 using the PTD 24, a game service representative may log-off of the PTD 24 and return it to a location for secure storage. For example, at the end of a shift, the game service representative may return the PTD 24 at one of the locations, for use by another game service representative. However, before the PTD 24 is assigned to another game service representative, the transaction history stored on the PTD 24 may be reconciled with a separate transaction history stored on a transaction server such as the EZ Pay server 26.

The assigning and unassigning of the PTD 24 to a game service representative and the transaction reconciliation are performed for security and auditing purposes. Another security measure which may be used on the PTD 24 is a fixed connection time between the PTD 24 and a transaction server. For example, after the PTD 24 has been assigned to a game service representative and the game service representative has logged on the PTD 24, the PTD 24 may establish a connection with one or more transaction servers including the EZ Pay server 26, the player tracking server 28, or the other servers 30, 32. The connection between a transaction server and the PTD 24 allows the PTD 24 to send information to the transaction server and receive information from the transaction server. The length of this connection may be fixed such that after a certain amount of time the connection between the PTD 24 and the transaction server is automatically terminated. To reconnect to the transaction server, the login and registration process must be repeated on the PTD 24.

A transaction server may provide one or more game service transactions. However, the PTD 24 may connect with multiple transaction servers to obtain different game service transactions. For example, the server 30 may be a prize transaction server allowing prize service transactions and server 32 may be a food transaction server allowing food service transactions. When a game service representative receives a prize service request from a game player, the PTD 24 may be used to contact the prize transaction server 30 using a wire-less communication link between the PTD 24 and the transceiver 64 connected to the prize transaction server 30. Similarly, when a game service representative receives a food service request from a game player, the PTD 24 may be used to contact the food transaction server 32 using a wire-less communication link between the PTD 24 and the transceiver 66 connected to the food transaction server 32.

The different transaction servers including the servers 26, 28, 30, 32 may be on separate networks or linked in some manner. For example, server 32 is connected to network 74, server 26 is connected to network 38, server 30 is connected to network 76, and the player tracking server 28 is connected to a player tracking network 78. In this embodiment, a network link 80 exists between network 76 and network 38.

Thus, server 26 may communicate with server 30 via the network link 80. A communication link between different servers may allow the servers to share game service transaction information and allow different communication paths between the PTDs and the transaction servers. Likewise, a network link 82 exists between network 78 and network 38, permitting the game server to communicate with the EZ Pay server 26 and the other servers 30,32 via the link 80.

Figure 4:
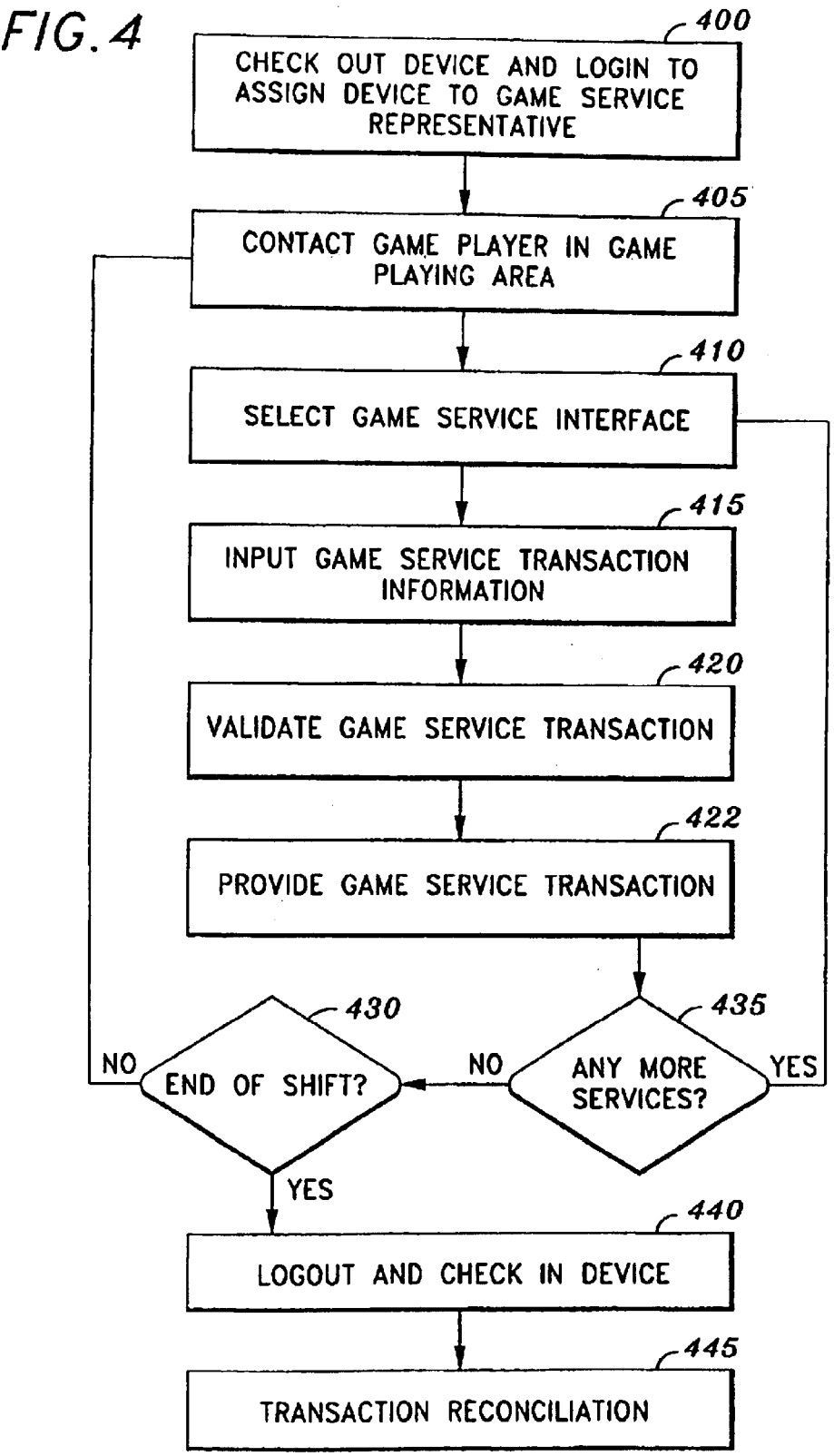
FIG. 4 is a flow diagram of a method of use of the portable transaction device of the invention by a gaming service operator.

FIG. 4 is a flow chart depicting one embodiment of a method for providing a game service using the PTD 24. In a step 400, a game service representative receives the PTD 24 and logs in to the device to assign the device. The check out process and assign process are for security and auditing purposes. In a step 405, the game service representative contacts a game player in the game play area requesting a game service of some type. In a step 410, the game service representative selects an appropriate interface on the PTD 24 using menus on the display screen 102 of the PTD 24 that allow the game service representative to provide a requested game service. In a step 415, the game service representative inputs game service transaction information required to perform a game service transaction. For example, to validate an award ticket, the game service representative may read information from the ticket using a ticket reader. As another example, to provide a food service including dinner reservation, the game service representative may enter a game player's name to make the reservation.

In a step 420, the transaction information obtained in step 415 is validated as required. For example, when a player attempts to cash out an award ticket, the information from the award is validated to ensure the ticket is both genuine (e.g. the ticket may be counterfeit) and has not already been validated. The validation process requires a number of transfers of information packets between the PTD 24 and the transaction server. The details of the validation process for an award ticket validation are described with reference to FIG. 6. When the transaction information is valid, in a step 422, a game service transaction is provided. For example, a room reservation may be made for a player requesting an accommodation service. A confirmation of the game service transaction may be sent to the transaction server for transaction reconciliation in a step 445. In one or more embodiments, the method may include the step of generating a receipt regarding the game service transaction.

In a step 435, after providing the service, a user of the PTD 24 may request another game service. In this event, the process returns to step 410 and selects an appropriate interface for the game service. When no additional service is requested and it is not the end of a shift, in a step 430, the game service representative returns to step 405 and contacts a new game player. In a step 440, when a shift has ended, the game service representative logs out of the PTD 24 and checks the device at a secure location so that the PTD 24 may be assigned to a different game service representative. In a step 445, before the PTD 24 is assigned to a different game service representative, a transaction history reconciliation is performed to ensure that the transaction history stored on the PTD 24 is consistent with the transactions previously confirmed with a transaction server during the game service representative's shift. The transaction history on the PTD 24 may be stored on a removable memory storage device on the PTD 24. Thus, the memory may be removed from the device for transaction reconciliation and replaced with a new memory. Thus, the device with the new memory may be assigned to a new game service representative while the transaction history from the previous game service representative assigned to the device is reconciled.

Figure 5:
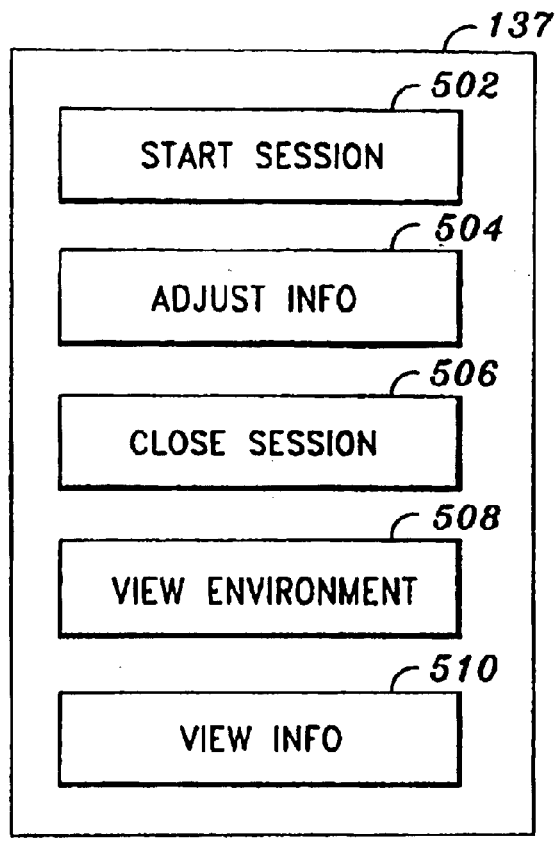
FIG. 5 illustrates an embodiment of a graphically displayed menu of player tracking functions which may be implemented using the portable transaction device of the invention.

As indicated above, the player tracking interface 137 may be used to implement a variety of player tracking and related functions. In one embodiment, the player tracking interface 137 includes a number of player tracking activity-related selections. Referring to FIG. 5, in one embodiment, when a user selects the player tracking interface 137, a menu of selections becomes available, such as by display on the display screen 102 of the PTD 24.

In one embodiment, the menu includes the selections of "start session" 502, "adjust information" 504, "close session" 506, "view environment" 508 and "view information" 510. The menu may include a lesser or greater number of selections and include selections not indicated herein. The actions initiated using each of these menu selections is detailed below. In one embodiment, before a user is permitted to select one of the menu items, the user must obtain a PTD 24 and login, as indicated in step 400 of FIG. 4.

Figure 5A:
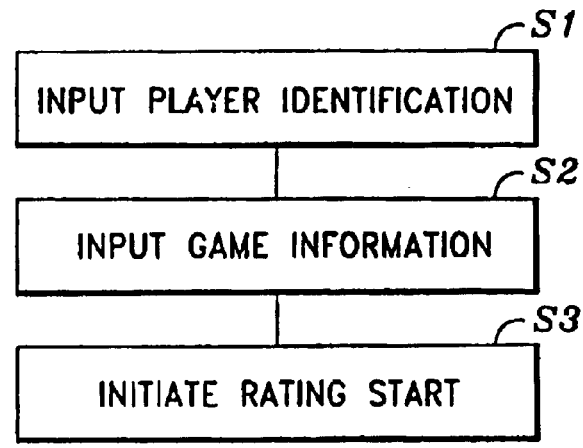
FIG. 5A is a flow chart illustrating a method of starting a player rating session in accordance with one of the functions of the menu illustrated in FIG. 5.

In one embodiment, when a user selects "start session" 502, a graphical user interface (not shown) is displayed to the user on the display screen 102 of the PTD 24. The graphical user interface may comprise an electronic "form" containing fields for the input of information. In one embodiment as shown in FIG. 5A, in a first step S1, a user inputs player identification information. This information may be input by a variety of means and include a variety of information.

In one embodiment, a player participating in a rewards program of the casino or other gaming environment may be provided with a player tracking card. This card may contain player identification information. In one embodiment, the card may include a magnetic stripe having identification information stored thereon. In this embodiment, the user of the PTD 24 may approach a player of a game and request their player tracking card. The user may scan the card using the card reader 140 of the PTD 24. Alternatively, the user may input the information manually, such as by use of the stylus 103 or buttons 104, or with a portable keyboard (not shown).

The input player identification information is preferably transmitted to the player tracking server 28 via the wireless communication link from the PTD 24 to the server 28 directly or via a relay 58 and one or more other network links. The player tracking server 28 may include a variety of player files, such as one or more files corresponding to a player and including identification information. The player identification information, such as a code stored on the player's card, may be used to access the file(s) for that player.

In one embodiment, files are provided which include information regarding a player's game play during one or more periods of time. A set of data regarding a player's game play during a period of time is referred to herein as a "rating" or "rating session." In one embodiment, one or more files contain player ratings corresponding to a player. These ratings files may be electronic files stored in an electronic folder corresponding to the player. In any case, a means is provided for identifying the player to which the rating file corresponds. As disclosed below, a variety of data may be stored in the rating file, such as length of time of play, and amounts bet and won. As is known, such information is useful to a casino in identifying players to be awarded "comps" and for a wide variety of other purposes. Individual ratings may be combined in one or more files to create an aggregate rating. The data comprising the rating may also be manipulated to generate other information.

In a step S2, the user inputs game information. The user may input a variety of information such as the particular game which the player is playing and the player's seating location. For example, the user may be permitted to identify that the player is seated at a $5 minimum bet gaming table. In one embodiment, as disclosed below, the gaming environment may be illustrated graphically to the user of the PTD 24 and the user may identify the location of a player, such as by using a table identification, seat identification or the like. For example, within the player tracking system all of the gaming tables and seats may be identified with unique codes, such as serial numbers. These serial numbers may be printed on the chairs and tables. A user of the PTD 24 may identify the game which the player is playing by entering the serial number for the table and/or chair.

In a step S3, the user starts the rating session. In one embodiment, this step comprises sending a completed electronic form including the player and game information to the player tracking server 28. In another embodiment, a menu element or displayed button or the like may be utilized. In one embodiment, when the rating session is started, data regarding player play is input to a file or files associated with that rating session until the rating session is closed. Once the rating session is opened, data regarding the player's game play is sent to the player tracking server 28 and is stored in the player's file or files.

In one embodiment, when a user selects "adjust information" 504, the user of the PTD 24 is permitted to provide player information to be associated with a player rating session. This step comprises, essentially, the input of player game play information. The game play information is stored in the player's file or files as part of the rating session.

The game play information may be input in a variety of manners. In general, the user of the PTD 24 will view or monitor player game play and input information regarding the game play. In another embodiment, other gaming personnel may monitor or track game play and then provide the data to the user of the PTD 24, who then inputs the information. In either event, table or other game play information is obtained, and this information is then input to the PTD 24 and transmitted via a wireless communication link to the player tracking server 28. In this manner, player game play information is tracked even through the particular game the player is playing is not of the type which permits direct electronic transmission of game play data from the gaming device to the player tracking server 28.

Figure 5B:
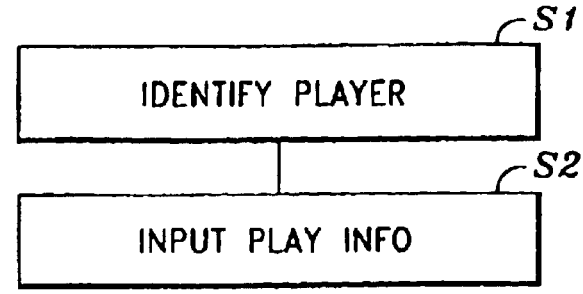
FIG. 5B is a flow chart illustrating a method of adjusting information in accordance with another of the function of the menu illustrated in FIG. 5.

One method of the function of adjusting information is illustrated in FIG. 5B. In one embodiment, when a user selects the "adjust information" 504 option, in a first step S1, the user is prompted to identify the player whose game play information is to be updated. In one embodiment, a graphical display of the gaming environment is displayed. As stated above, when the user of the PTD 24 starts a session, an identified player is preferably associated with a particular game or game location. In this step, the user selects the gaming location at which the player is playing to identify the player.

In a step S2, a graphical user interface is displayed. Preferably, the graphical user interface includes information regarding a player at a selected location. In this manner, the user may verify that the game play information which is being input corresponding to a particular player matches the identity of the player in the system. In one embodiment, the player information which is available to the user may be varied. In an embodiment of the invention, when a player elects to participate in the rewards program, the player may be requested to provide a wide variety of identification information such as, but not limited to the following: name, address, birth date/age, color of hair, color of eyes, height, weight, social security number, telephone number, and email address. This information is preferably stored in a file or files corresponding to the player, such as at the player tracking server 28. In one embodiment, some or all of this information may be displayed to the user of the PTD 24. Using the provided information, the user of the PTD 24 may verify that the actual player playing the game and the identified player in the system are the same.

In one embodiment, the graphical user interface may include fields permitting the user of the PTD 24 to input player identification information, such as the player's hair color and the like. In this way, the user of the PTD 24 may update the player's identification information.

The graphical user interface also preferably includes blank fields for inputting player game play information. For example, fields may be provided for inputting average bet in dollars per hour or other time period, average win in dollars per hour or other time period, and a variety of other game play related data.

A variety of different game play information may be input or tracked using the PTD 24. The particular information which is tracked may vary dependent on a wide variety of circumstances, including the type of game the player is playing.

As one example, the PTD 24 may be used to track the play of a baccarat player. As is known, in the play of bacarrat, players generally alternate in serving as the bank. The house may be paid a commission based on player play. In some instances, the house may reward players by paying out a commission based upon the value of money wagered. During game play, monies frequently change hands, including when players give away a portion of their monies to other players and friends.

In accordance with the invention, the PTD 24 may be used to track this play, such as to ensure that the house pays the correct commission to a player based upon their wagers. In this embodiment, the user of the PTD 24 may enter player wager and money transfer information. A specific user interface may be provided for this purpose. For example, upon the user selecting "adjust information" 504, a menu may be presented to the user which allows the user to select from a number of different customized input configurations, such as "baccarat," "21," "poker" or the like.

In one embodiment, when a user selects "close session" 506, the user of the PTD 24 identifies a particular player or player session, and requests that the session be closed. A user would select this option, for example, if a player quits playing a particular game. When the user selects this option, the player's rating session is closed, preventing input of further game play data for that session. In one embodiment, when the user of the PTD 24 selects this function, a signal is transmitted to the player tracking server 28 which causes the ratings session file to be closed. Game play data regarding the player received after closure of the session is not associated with that session, but with another session. In another embodiment, at the closing of a session, input of additional information may be permitted in order to associate additional information with that session. For example, at the close of a session, a user of the PTD 24 may wish to enter information regarding amounts (either cash or chips) which a player is leaving a game with.

In one embodiment, when a user selects "view environment" 508, a graphical representation of the gaming environment is preferably displayed to the user of the PTD 24. As set forth above, the player tracking server 28 or other device may store gaming environment information. This information may comprise a two-dimensional representation of the gaming environment. The representation may include graphical representations of table games, including the gaming table per se and player seating. As indicated, this gaming equipment may be identified by a serial number or the like. Of course, the graphical representation may be arranged in a variety of manners. Regardless of the specific implementation, it is desired that the user of the PTD 24 be able to view a representation of all or a part of the gaming environment in a manner permitting the user to identify the corresponding "real" equipment. Thus, as one example, the graphically illustrated gaming equipment may be illustrated in the same layout or arrangement as the physical gaming equipment.

In one embodiment, when a user selects "view information" 510, information regarding one or more players is displayed. In one embodiment, the user is prompted to identify the player or players for which information is to be displayed. For example, the user may select a particular location from a graphical representation of the gaming environment. The user may also input a table serial number, input the player's name or provide other information identifying the player (such as physical characteristic data).

In response to this request, the player tracking server 28 preferably transmits the player information. The information may include player identification information as well as player gaming information, such as gaming information from a single session or more than one session.

In some situations, a player may move from one gaming table to another, or from one position at a gaming table to another position at the same table. As one aspect of the invention, the user of the PTD 24 may "move" a player when the player moves. The user of the PTD 24 may use the graphical representation to move the player when the player moves. For example, information regarding a player may be displayed in association with a particular position at a graphically portrayed gaming table on the PTD 24. The user may "drop and drag" this information to the player's new position if the player moves.

In one embodiment, when a player is "moved," the player's rating for present play at a particular gaming table or position is closed and a new rating is automatically opened. Information regarding the player is automatically updated, including information regarding the specific gaming table at which the player is now playing. These steps avoid the user having to close the player's first session, and manually open a new session including re-entering pertinent player identification and other information.

Of course, a player may be "moved" in other manners. For example, the user may simply enter the player's name, identification number or the like in association with a new game position. The prior rating is then closed and the new one automatically opened and updated.

In one or more embodiments of the invention, the PTD 24 may be used to enroll a player in the player tracking, rewards or other program. Such programs may include slot clubs and table game rewards programs, and general player rewards programs.

In one embodiment, the menu of the player tracking interface 137 may include an "enroll" element. By selecting this element, an enroll function may be initiated. In one embodiment, a graphical user interface is generated and displayed. The graphical user interface data may be generated and/or transmitted from a remote server for display by the PTD 24. The interface may include fields for accepting the input of data, such as player identification information. As is known in the art, a variety of player information is generally obtained for use in enrolling a player in a rewards program, and as such will not be described in detail herein.

Utilizing supplied player information, a remote server may generate one or more files or other data entries corresponding to the player for use in effecting the rewards program for that player. In one embodiment, the player identification information referred to above may be selected or generated by the remote server and transmitted to the PTD 24. The user of the PTD 24 may then utilize this information for a variety of purposes, including starting a session as detailed above.

The user of the PTD 24 may issue the player their player identification information, such as player i.d. number and password. In one embodiment, the user may be permitted to effect the printing of a temporary or permanent player tracking or identification card, such as at a printer 56.

In one embodiment of the invention, groups of players maybe tracked. In casino parlance, specific groups of players are often referred to as "junkets." For example, a tour bus company may bring a group of players from a remote location. The players from this bus tour may be considered as part of a single identifiable junket.

It is desirable for the casino to monitor the activities of the players of a specific junket. For example, the casino may determine that players associated with specific bus tours or tours from specific locations engage in the play of casino games more frequently. The casino may reward these players with complementaries or "comps," as direct advertising to those geographic locations to entice more players and the like. Further, the casino may target comps, such as free game play, to players associated with specific junkets. For example, players may be enticed to take a specific bus tour based upon a casinos offer of $10 of free game credits. When the player reaches the casino, the casino needs to confirm that the player is entitled to the credit and provide the credit.

In accordance with the invention, a user of the PTD 24 may enter or associate a player with a specific group or junket. In one embodiment, a user may input data associating a player with a specific group or junket. For example, a user of the PTD 24 may search within the player tracking system for a list of junkets, select the appropriate junket and then log the player into the junket, such as by inputting their player tracking identification number, player name or the like. As indicated above, a player may not yet be registered with the player tracking system of a casino. The user of the PTD 24 may not only enroll the player, but associate them with a junket via the PTD 24. In like fashion to the method of enrolling the player, the user may associate a player with a junket by inputting appropriate information.

It will be appreciated that the various functions and features herein need not be associated with the specific menu items or be categorized as indicated above. There may be a greater or lesser number of menu items and the various functions may be presented by other than menu items.

A user of the PTD 24 may initiate a variety of other functions, as evident from the various interfaces 106. Several particular gaming service functions which may be implemented using the gaming operations service interface 135 will now be described in more detail.

The gaming operations service interface 135 may include a number of sub-menu elements. In one embodiment, the gaming operations service interface 135 may be utilized to effect a fill, credit or similar transaction at a gaming table. For example, the user may request a rack fill at a table game.

The rack fill may be requested through a central accounting system implemented at a remote server. The rack fill may request that chips be delivered to a particular gaming table. The gaming table may be identified by an identification number or the like. The amount of the rack fill (i.e. chip value) may be verified by the user and transmitted to the accounting system for reconciliation.

Likewise, a user may execute a credit using the PTD 24. For example, if too large a number of chips are retained by the house at a particular table game, the chips may be removed from the casino floor by redemption to the casino cage. The user may request a credit, and when chips are removed, verify such along with the value and the table identification.

It will be appreciated that the fill, credit and similar functions may be implemented in a variety of fashions. For example, the gaming operations service interface 135 may include a fill/credit menu selection. By selecting this menu item, further menu items or a graphical user interface including input data or other fields may be displayed. The user may input data, such as gaming table identification or other information. The information may be transmitted to a remote server for processing.

In one embodiment, the gaming operations service interface 135 may be used to facilitate the "opening" and/or "closing" function associated with a gaming table 21. There are a number of activities associated with a table opening or closing, as is known in the art. One such activity is an accounting activity. At a table closing, the value of the chips, markers and the like are reconciled against the value of the chips, markers and the like associated with the table game at the table opening, less amounts paid out in winnings and plus amounts bet and lost to the house. In this manner assurances are provided that chips or the like are not being stolen, lost or the like.

Similarly, at a table opening, the value of chips, markers or the like are determined for use in the table closing accounting function. Other activities include tracking personnel which are assigned to a table when it opens.

In one embodiment, such activities are implemented using the PTD 24. A user of a PTD 24 may travel to a closing table. There, the user may determine the value of chips, markers and the like and transmit that information to a central accounting system for verification. At the time of table opening, the user may verify the value of chips, markers or the like and transmit such to the accounting system. The user may also identify newly assigned personnel, such as by inputting (such as by card scanning) personnel identification numbers.

In one embodiment, the gaming operations interface 135 may be used to facilitate the issuance of a marker or its redemption. In one embodiment, the user may utilize the PTD 24 to determine if a player has an available credit balance or to establish a balance. The user may identify a player, such as by name, player tracking identification or the like. A request for credit may be transmitted to a remote server for processing. If credit is available, a marker may be printed. In one embodiment, the marker may be printed at a local printer 56, such as one located near the table game at which the player wishes to play.

As will be appreciated, a wide variety of information may be obtained, input and transmitted in order to process the marker issuance request. Besides player identity, information such as marker amount may be provided. In addition, confirmation of the acceptance of the marker by the player may be provided using the PTD 24. In a preferred embodiment, this acceptance is by endorsement. The endorsement may be by signature. For example, if the marker is approved for printing, a signature block may be generated on the display 102 of the PTD 24. The player may be required to sign in that signature block, such as by using the stylus 103 and input to the display 102.

In other embodiments, the endorsement may be by approval, such as signature, on record. In such an embodiment, confirmation of identity may be required. This confirmation may be provided by biometric identification. For example, a player's fingerprint or retinal scan may be obtained using a peripheral attached to the PTD 24. This information may be transmitted for verification of identity.

As indicated, the PTD 24 may be used to effect marker redemption as well. A particular marker may be identified to the user of the PTD 24. The user may then select the marker within the system, such as by an identification number, by searching for value, player name or the like. Information is then preferably displayed regarding that marker. The user may then select the marker as paid, and this information may be transmitted to the accounting system for update and processing. In another arrangement, the marker may be transferred to a new location for payment, such as to a casino cage. In this embodiment, the user of the PTD 24 may indicate the transfer to reconcile, for example, the change in value at the particular gaming table associated with the transfer of the marker from the table to the casino cage.

In one embodiment, the gaming operations interface 135 may be utilized to obtain game rules and calculate bet payoffs. In one embodiment, the user of the PTD 24 may request game rules. These game rules may be transmitted from a remote location, such as a remote server. A menu or other interface may be provided which enables the user to identify particular game or games for which the rules are sought. In one embodiment, the game rules are transmitted to the PTD 24 as data which is displayed on the display screen 102. In one embodiment, the user may print out the game rules, such as at an adjacent printer 56.

In similar fashion, in one embodiment the user may access a calculating function. The calculating function may be used for a variety of purposes. In one embodiment, the calculating function may be used to determined a bet payoff. This function may be used, for example, to verify the actual payoff based on a player's bet in the event the outcome of the game is winning. The function may also be used to simulate actual payoffs. This function may be used, for example, to verify the payoff at a table game based upon a player's bet.

The calculating function may be associated with the PTD 24 itself. In a preferred embodiment, however, the calculating function is associated with a remote server. In this arrangement, a user may select the calculating function from a menu associated with the gaming operations interface 135. In response to such a selection, the remote server may send graphical user interface information for display by the PTD 24. This interface information may comprise another menu or an interface permitting specific user input, such as field boxes for type of game, amount bet, type of bet and the like. Upon input, the remote server is preferably arranged to execute a function calculating the bet payoff or other function.

In one embodiment, the gaming operations interface 135 may be utilized to initiate a security function. A user may desire to request security for a number of reasons. For example, a player may place an exceptionally large bet at a table game, the user may notice suspicious activity or the like. In any event, the user of the PTD 24 may request a security function. In one embodiment, such a request is transmitted to a remote location, such as a security room. The request may be routed from the PTD 24 via a wireless link via one or more relays to a transceiver associated with a server or network connection to the security room device (s). The request for security may be for a specific type or nature of security, such as personnel intervention, camera monitoring or the like. In addition, the request may include information to aid the security personnel. For example, the request may include a gaming table identification code, location code or the like enabling the security personnel to identify the area or location where the security is desired.

In one embodiment, the gaming operations interface 135 may be used to provide input regarding game data. As indicated above, the game data may be player specific. In another embodiment, the information may be more general. For example, the casino may wish to track the number of players who are playing at a particular gaming table or the number of players or persons within an area of the casino. In such event, the user of the PTD 24 may input such information. The information may be, in one embodiment, player "headcount" information comprising a user count or estimate of the number of players or persons.

FIG. 6 is a flow chart depicting another of the functions which may be implemented using the PTD 24, a method for validating information for providing a personal game service. In the embodiment shown in the figure, a ticket is validated in a manner consistent with an EZ Pay ticket system. The EZ Pay ticket is usually used for award tickets. However, the system may be adapted to provide tickets for other services including food services, prize services or accommodation services. In a step 600, a request for game service transaction information read from a ticket is sent via a wire-less communication interface on the PTD 24 to the appropriate transaction server as described with reference to FIG. 1. In a step 605, the server identifies the appropriate clerk validation ticket (CVT) 34 which "owns" the ticket. When a CVT owns a ticket, the CVT has stored information regarding the status of a particular ticket issued from a gaming machine connected to the CVT 34. In a step 610, the server sends a request to pay the ticket to the CVT 34 identified as the owner of the ticket. Typically, the pay request indicates that a service on the ticket has been requested. For a cash ticket, a pay request means a request to cash out the ticket has been made. For a free meal, a pay request means a request to obtain the meal has been made. In a step 615, the CVT 34 receives the pay request for the ticket and marks the ticket pending. While the ticket is pending, any attempts to validate a ticket with similar information is blocked by the CVT 34.

In a step 620, the CVT 34 sends back a reply with context information to the server. As an example, the context information may be the time and place when the ticket was issued. The information from the CVT 34 to the server may be sent as one or more data packets according to a communication standard shared by the CVT 34 and server. In a step 625, after receiving the validation reply from the CVT 34, the server marks the pay request pending and sends a pay order to the PTD 24. While the pay request is pending, the server will not allow another ticket with the same information as the ticket with the pay request pending to be validated.

In a step 630, the game service representative may choose to accept or reject the pay order form the server. When the game service representative accepts the pay order from the server, in a step 640, the PTD 24 sends a reply to the transaction server confirming that the transaction has been performed. The transaction server marks the request paid which prevents another ticket with identical information from being validated. In a step 645, the server sends a confirmation to the CVT 34 which allows the CVT 34 to mark the request from pending to paid. When the game service representative rejects the pay order from the server, in a step 650, the PTD 24 sends a reply to the server to mark the pay request from pending to unpaid. When the ticket is marked unpaid, it may be validated by another PTD 24 or other validation device. In a step 655, the server sends the reply to the CVT 34 to mark the pay request from pending to unpaid which allows the ticket to be validated.

As described above, in one or more embodiments of the invention, a ticket may be used to provide credit/value for establishing entitlement to a service or a good, such as the right to play a game or obtain food. As detailed above, the PTD 24 may include a card reader 140. In such an arrangement, a user of the PTD 24 may use a credit card or other magnetic stripe type card for providing credit/value. Alternatively, the PTD 24 may include one or more other types of devices for obtaining/receiving information, such as a smart card reader. In such arrangements, the PTD 24 device may read information from the credit card, smart card or other device. These cards may comprise the well known credit or debit cards. This information may be used to provide the credit/value. In the example of a credit card, the player's account information may be read from the card and transmitted from the PTD 24 to the controller 42. Credit card/credit validation information may be associated with a credit card server (not shown). This credit card server may be associated with a bank or other entity remote from the casino or place of use of the PTD 24 and the controller 42. A communication link may be provided between the controller 42 and remote server for sending credit card information there over.

In one embodiment, when a player utilizes a smart card or credit card the amount of associated credit or value may be transmitted to the EZ Pay server 26, and then the credited amount may be treated in exactly the same manner as if the credit/value had been provided by a ticket. When a player wishes to cash out, the EZ Pay server 26 has a record of the original amount credited and the amounts of any awards, losses or payments, and may then issue the player a ticket representing the user's total credit.

In one or more embodiments, other financial or game related services may be implemented than those specifically described. These services maybe implemented through interfaces 106 which are illustrated, or additional ones. For example, in one embodiment, a user of the PTD 24 may effect the issuance of certain tax transactions, such as the mandatory withholding of taxes and issuance of tax documents to a player upon winning.

It will be appreciated that the system and method of the invention need not be limited to a specific casino or gaming location. For example, the gaming system 20 may have components located at a variety of physically remote locations, such as multiple casinos. This may require, for example, additional communication links, such as implemented by wide or local area networks, and including dedicated or non-dedicated links, including the Internet. In such an arrangement, the gaming system 20 may be used to provide services and track activities of players at multiple locations. For example, in such a configuration, a player may be issued a single player tracking or identification card. The player may utilize that single card at any of the casinos associated with the gaming system 20, and the user of the system may identify the player and provide the services and engage in the functions described above.

In accordance with the invention, a gaming system or environment is provided which includes one or more portable transaction devices. The portable transaction devices permit a user to perform a variety of functions and provide a variety of services to a player. These functions include issuing and validating tickets and other awards, accounting, as well as tracking player game play.

In accordance with the invention, a means is provided by which a player's play at a table or other game which is not or can not be directly electronically connected to a system, can be tracked. A user of the portable transaction device of the invention may track player play and input the play information for use in a player tracking function of the casino.

In addition to the benefit of tracking a player's play for purposes of determining whether the player is entitled to a "comp," the collected information may be used for accounting and other purposes. For example, a casino may aggregate ratings for all players of a specific table game over a period of time. The rating information may be used to verify actual amounts paid or won at the table as indicated by the dealer. This information is useful in identifying if theft is occurring.

By examining ratings for players at specific table games, including specific table positions, the casino may identify performance and other issues. For example, the casino may identify that a particular table is in an undesirable location, or that the performance of a dealer is sub-par or the like.

Another advantage of the PTD 24 in the gaming environment as detailed is the ability to amass and utilize player identification information. The user of the PTD 24 may verify identification information of a player in person, updating the player's file. The user of the PTD 24 may also utilize remotely stored player identification information in a variety of ways. For example, when the player provides their player tracking card, the PTD 24 may display the player's name and information regarding their game play. The user may then greet the player by name. The user may also converse with the player regarding their play activities, such as "glad to see you are back, we've missed you since your visit last April." In this regard, the user may utilize the information to improve the relationship between the casino and player by making their relationship more personal.

It will be appreciated that the PTDs 24 may be used by a variety of personnel. For example, the PTD 24 user may be assigned to each gaming table. In another embodiment, the PTD 24 may be assigned to a "pit boss" who oversees a group of gaming tables.

It will be understood that the above described arrangements of apparatus and the method therefrom are merely illustrative of applications of the principles of this invention and many other embodiments and modifications may be made without departing from the spirit and scope of the invention as defined in the claims.

We claim:

1. A method of tracking game activity using a portable transaction device, the method comprising:
   in the portable transaction device, receiving a request to rate a player wherein the rating of the player is for allowing a non-game player to estimate an amount bet or an amount lost by the player while the player is participating in the game activity in a game playing areas;
   inputting player identification information to a portable transaction device, said information identifying said player;
   transmitting said player identification information from said portable transaction device to a player tracking server over a wireless communication link;
   receiving a confirmation from the player tracking server via the wireless communication link that a player rating file has been opened for the identified player;
   generating a game service interface on a touch screen display of the portable transaction device for inputting game play event information used for rating the player during their participation in the game activity;
   inputting the game play event information using the game service interface; and
   transmitting the game play event information from said portable transaction device to said player tracking server.

2. The method in accordance with claim 1 further comprising receiving player identification via a card reader coupled to the portable transaction device wherein the player tracking identification information is stored on a player tracking card.

3. The method in accordance with claim 1 further comprising generating a menu of transactions available on the portable transaction device wherein one of the transactions is for rating the player and receiving an input to select the player rating transaction from the menu of transactions.

4. The method in accordance with claim 1 further comprising displaying a graphical user interface at said portable device for use in receiving input.

5. The method in accordance with claim 1 further comprising transmitting a signal from said portable transaction device to said player tracking server for causing said player rating file to be closed.

6. The method in accordance with claim 1 wherein said game play event information input via the game service interface comprises at least one of an amount wagered or an amount lost by said player during the game playing activity.

7. The method in accordance with claim 1 wherein the player identification information allows the player to be identified and to be rated as part of a group.

8. The method in accordance with claim 1 wherein the player is not registered in a player tracking system at a casino where the player is participating in the game activity.

9. The method in accordance with claim 1 further comprising:
   generating a graphical representation of the gaming environment in which the game activity is taking place wherein the graphical representation is for identifying a location in the gaming environment where the game activity is occurring.

10. The method in accordance with claim 9 wherein the graphical representation includes a depiction of layout for one or more table games.

11. The method in accordance with claim 1 wherein the game service interface is customized to receive different inputs for razing of the player according to a type of game the player is playing.

12. The method in accordance with claim 1 further comprising:
   storing transaction records to the portable transaction device and
   reconciling one or more transaction records stored on the portable transaction device with corresponding transaction records stored on a remote server.

13. The method in accordance with claim 1 further comprising:
   inputting identification information for one identifying one of a table, a seat or combinations thereof where the player is located during the game activity.

14. The method in accordance with claim 1 wherein during the game activity the player participates in game activities at a number of different locations in the game playing area and wherein game play event information that has occurred at two or more different locations is used to rate the player.

15. The method in accordance with claim 1 further comprising:

generating a game service interface for enrolling the player in a player tracking system at a casino;

receiving enrollment information for allowing the player to enroll in the player tracking system; and transmitting the enrollment information to the player tracking system.

16. The method in accordance with claim 1 wherein the game playing activity is participating in a table game in the game playing area.

* * * * *

UNITED STATES PATENT AND TRADEMARK OFFICE
CERTIFICATE OF CORRECTION

PATENT NO. : 6,800,029 B2
DATED : October 5, 2004
INVENTOR(S) : Rick Rowe et al.

It is certified that error appears in the above-identified patent and that said Letters Patent is hereby corrected as shown below:

Column 24,
Line 54, change "razing" to -- rating --

Signed and Sealed this

Nineteenth Day of April, 2005

JON W. DUDAS
*Director of the United States Patent and Trademark Office*